United States Patent
Hung et al.

(10) Patent No.: US 12,416,951 B2
(45) Date of Patent: Sep. 16, 2025

(54) ELECTRONIC DEVICE INCLUDING A MOVABLY CONNECTED BEZEL

(71) Applicant: Wistron Corp., New Taipei (TW)

(72) Inventors: Chi-Yu Hung, New Taipei (TW);
Chung-Jung Wu, New Taipei (TW);
Ying-Sheng Zeng, New Taipei (TW)

(73) Assignee: Wistron Corp., New Taipei (TW)

( * ) Notice: Subject to any disclaimer, the term of this patent is extended or adjusted under 35 U.S.C. 154(b) by 247 days.

(21) Appl. No.: 18/147,658

(22) Filed: Dec. 28, 2022

(65) Prior Publication Data

US 2024/0111342 A1    Apr. 4, 2024

(30) Foreign Application Priority Data

Sep. 29, 2022 (TW) .................................. 111136880

(51) Int. Cl.
*G06F 1/20* (2006.01)
*G06F 1/16* (2006.01)

(52) U.S. Cl.
CPC ............ *G06F 1/203* (2013.01); *G06F 1/1656* (2013.01); *G06F 1/1681* (2013.01)

(58) Field of Classification Search
CPC ...... G06F 1/203; G06F 1/1656; G06F 1/1618; G06F 1/1681; E05Y 2999/00; E05D 3/122
See application file for complete search history.

(56) References Cited

U.S. PATENT DOCUMENTS

| | | | | |
|---|---|---|---|---|
| 2004/0107537 A1* | 6/2004 | Ahn | ..................... | H04M 1/0243 16/221 |
| 2004/0242039 A1* | 12/2004 | Griffin | ................. | H05K 7/1409 439/157 |
| 2007/0289099 A1* | 12/2007 | Jung | ..................... | G06F 1/1616 16/354 |
| 2010/0214743 A1* | 8/2010 | Huang | .................. | G06F 1/1667 361/679.01 |
| 2018/0373292 A1* | 12/2018 | Perelli | ..................... | G06F 1/165 |
| 2020/0142456 A1* | 5/2020 | Hsu | ......................... | G06F 1/203 |
| 2020/0285273 A1* | 9/2020 | Liang | .................... | G06F 1/1649 |
| 2022/0057844 A1* | 2/2022 | Nakamura | ............ | G06F 1/1681 |
| 2022/0330455 A1* | 10/2022 | Lai | .......................... | G06F 1/206 |

FOREIGN PATENT DOCUMENTS

TW          201722249 A      6/2017

* cited by examiner

*Primary Examiner* — Allen L Parker
*Assistant Examiner* — Peter Krim

(57) ABSTRACT

An electronic device is provided, and the electronic device includes a base, a cover plate, and a bezel. The base has a sidewall where an opening portion is formed. An airflow selectively passes through the opening portion. The cover plate is pivotally connected to the base. The bezel is movably connected to the cover plate, wherein the bezel is rotated facing the opening portion selectively. The arrangement of the bezel may reduce the gap between the bezel and the down edge of the opening portion of the base, reducing the airflow flowing downward back to the heat-dissipation mechanism in the base. Therefore, the heat-dissipation efficiency of the electronic device is enhanced.

20 Claims, 9 Drawing Sheets

ELECTRONIC DEVICE INCLUDING A MOVABLY CONNECTED BEZEL

CROSS REFERENCE TO RELATED APPLICATIONS

This application claims priority of Taiwan Patent Application No. 111136880, filed on Sep. 29, 2022, the entirety of which is incorporated by reference herein.

BACKGROUND

Technical Field

The disclosure relates to an electronic device, and in particular to an electronic device that includes a bezel.

Description of the Related Art

With the advancements being made in modern technology, large electronic devices have found wider application. Portable electronic devices, such as computers and cell phones in particular, have gradually become indispensable parts of daily life. The computing ability of these electronic devices is improving. However, a large amount of heat is generated during the operation of these electronic devices. How to improve the heat dissipation efficiency of electronic devices, and thereby to maintain the level of performance of said electronic devices, is a very important issue.

BRIEF SUMMARY

The present disclosure provides an electronic device. The electronic device includes a base, a cover plate, and a bezel. The base has a sidewall, wherein an opening portion is formed on the sidewall, and an airflow selectively passes through the opening portion. The cover plate is pivotally connected to the base. The bezel is movably connected to the cover plate, wherein the bezel is rotated to face the opening portion selectively.

The present disclosure provides an electronic device. The electronic device includes a base, a cover plate, and a bezel. The base has a sidewall. An opening portion is formed on the sidewall. An airflow selectively passes through the opening portion. The cover plate is pivotally connected to the base. The bezel is connected to the base and the cover plate. The bezel is disposed below the opening portion.

BRIEF DESCRIPTION OF THE DRAWINGS

The disclosure may be more fully understood by reading the subsequent detailed description and examples with references made to the accompanying drawings, wherein.

DETAILED DESCRIPTION OF THE INVENTION

The tray and the electronic device of some embodiments of the present disclosure are described in the following description. However, it should be appreciated that the following detailed description of some embodiments of the disclosure provides various concepts of the present disclosure which may be performed in specific backgrounds that may vary widely. The specific embodiments disclosed are provided merely to clearly describe the usage of the present disclosure by some specific methods without limiting the scope of the present disclosure.

In addition, relative terms such as "down" or "bottom," "up" or "top" may be used in the following embodiments in order to describe the relationship between one element and another element in the figures. It should be appreciated that if the device shown in the figures is flipped upside-down, the element located on the "down" side may become the element located on the "up" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure. Unless defined otherwise, the first or second element, material and/or portion in the claims may be interpreted as any element, material and/or portion in the specification as long as it conforms to the description in the claims.

Unless defined otherwise, all terms (including technical and scientific terms) used herein have the same meaning as commonly understood by one of ordinary skill in the art to which the present disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exact the same as the description herein. It should be noted that unless defined specifically, even if the above terms are not recited in the description, it should be read as the same meaning as those approximate terms are recited.

Figure 1:
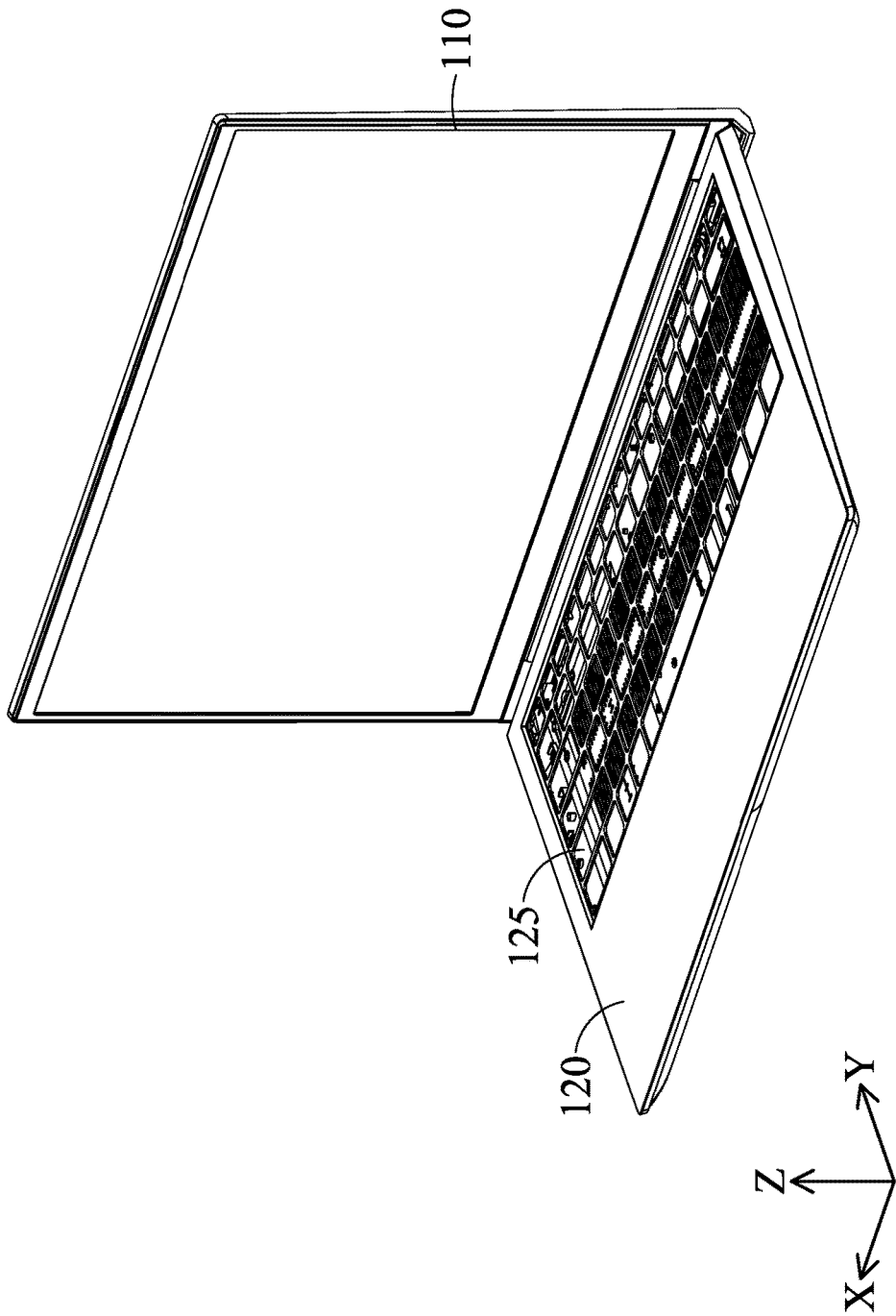
FIG. 1 illustrates a perspective view of an electronic device in accordance with some embodiments of the present disclosure.

First, referring to FIG. 1, FIG. 1 illustrates a perspective view of an electronic device 100 in accordance with some embodiments of the present disclosure. In some embodiments, the electronic device 100 may include a cover plate 110 and a base 120. The cover plate 110 is pivotally connected to the base 120 and rotates around the pivot point between the cover plate 110 and the base 120, so that the user can adjust the cover plate 110 to a suitable angle for use. For example, the cover plate 110 may include a display panel that is used to display information to the user. The base 120 may have a plurality of opening portions 125 for setting up an input device (not shown). Accordingly, the user can input commands to the electronic device 100 via the above-mentioned input device to control the electronic device 100. It should be understood that the above configuration of the cover plate 110 and the base 120 merely serves as an example, and those skilled in the art are able to arbitrarily dispose the mutually rotatable cover plate 110 and the base 120 according to the content of the present disclosure. For example, the electronic device 100 may be a notebook computer, but the present disclosure is not limited thereto. The electronic device 100 may be any electronic device that has a cover plate 110 and a base 120.

Figure 2:
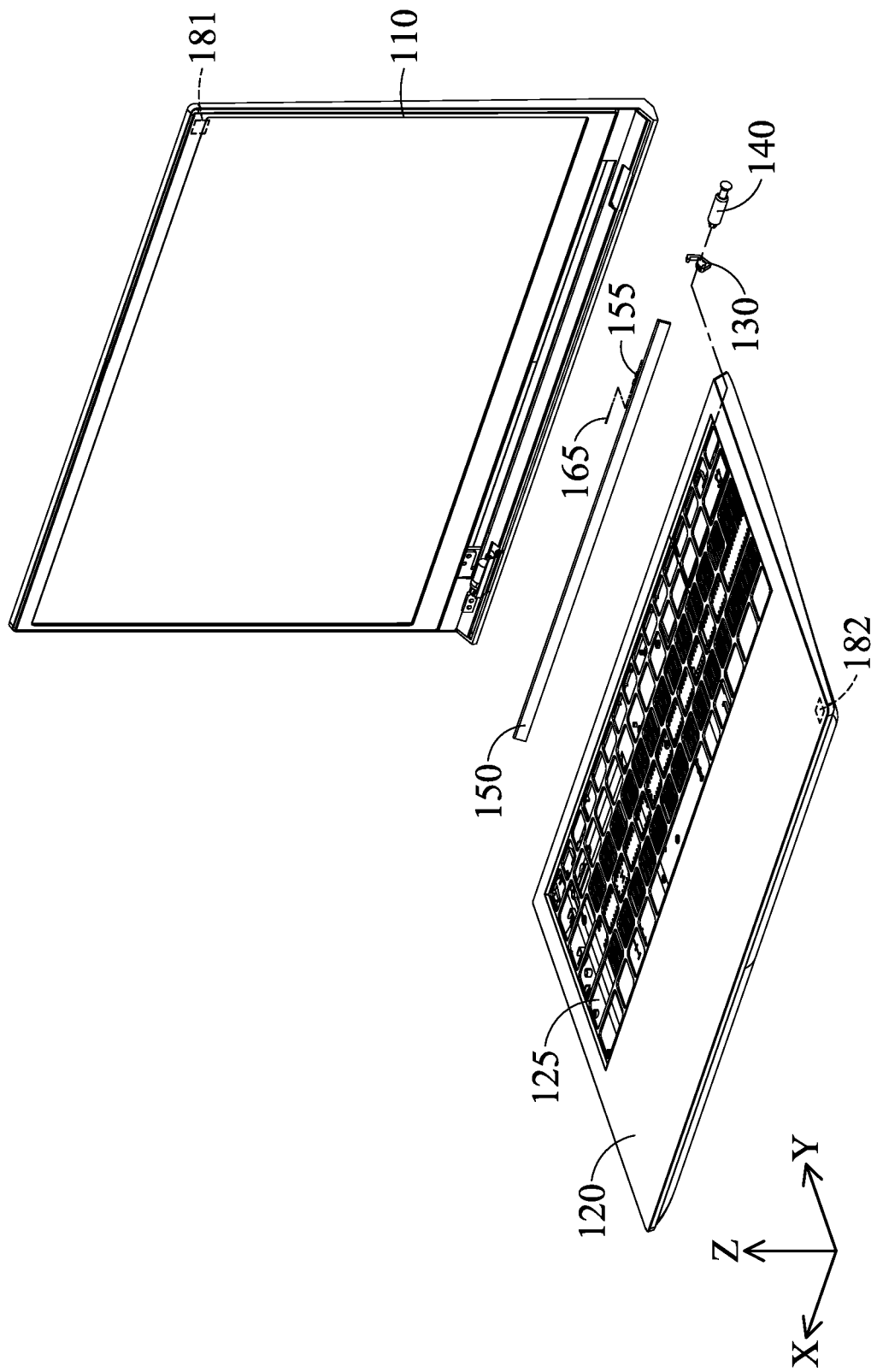
FIG. 2 illustrates an exploded view of the electronic device in accordance with some embodiments of the present disclosure.

FIG. 2 illustrates an exploded view of the electronic device 100 in accordance with some embodiments of the present disclosure. As shown in FIG. 2, the electronic device 100 also includes a push rod 130, a cam 140 and a bezel 150. The cam 140 is disposed on the base 120, the bezel 150 is movably disposed on the cover plate 110, and the push rod 130 is connected between the cam 140 and the bezel 150. In some embodiments, the cover plate 110 and the base 120 are connected to each other via a hinge (not shown) and are rotatable relative to each other. The cam 140 may be connected to and linked-up with the aforementioned hinge. In some embodiments, the bezel 150 is pivotally connected to the cover plate 110 and selectively pivotally rotates relative to the cover plate 110. For example, the bezel 150 may have a linkage portion 155, and a pivot rod 165 may be disposed to pass through the linkage portion 155 of the bezel 150 and a corresponding structure of the cover plate 110 (for example, the linkage portion 115 shown in FIG. 6). As a result, the bezel 150 may be pivotally connected to the cover plate 110 via the pivot rod 165, thereby the range of the rotation angle of the bezel 150 may also be defined, so that the bezel 150 may be kept in a proper position.

In some embodiments, the electronic device 100 may include a sensor 181 that is disposed in the cover plate 110 and another sensor 182 that is disposed in the base 120. The sensor 181 and the sensor 182 selectively detect the relative position of the cover plate 110 and the base 120. It should be understood that the sensor 181 and the sensor 182 are merely examples, and the sensor 181 and/or the sensor 182 may be disposed at other positions on the cover plate 110 or the base 120, or various types of sensors may be adopted. These configurations are all included within the scope of the present disclosure, and all possibilities will not be listed below.

More specifically, when the user opens the cover plate 110 (that is, the cover plate 110 rotates relative to the base 120), the hinge connecting the cover plate 110 and the base 120 would rotate, driving the cam 140 to rotate at the same time. The push rod 130 is connected to the cam 140 and is abutted against the bezel 150. In some embodiments, the push rod 130 rotates along with the rotation of the cam 140, thereby pushing the bezel 150 to rotate relative to the cover plate 110. The operation of the push rod 130, the cam 140 and the bezel 150 will be further explained in the following paragraphs with reference to FIGS. 3 to 5.

Figure 3:
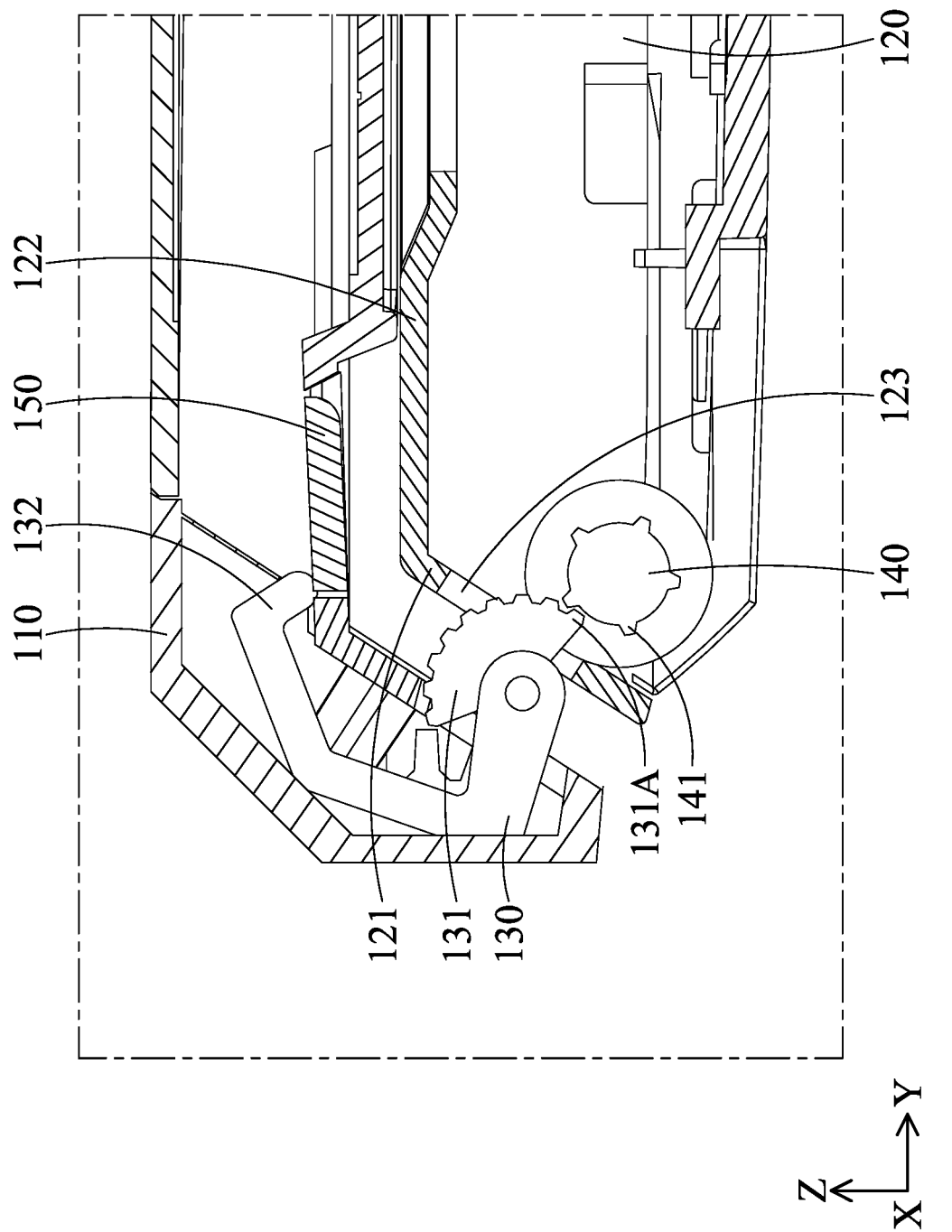
FIG. 3 illustrates a cross-sectional view of the electronic device in accordance with some embodiments of the present disclosure.

FIG. 3 is a cross-sectional view of the electronic device 100 in accordance with some embodiments of the present disclosure. As shown in FIG. 3, the cover plate 110 of the electronic device 100 is in a closed state relative to the base 120. To be more specific, the cover plate 110 may substantially cover the top surface 122 of the base 120 (which may be defined as an angle of 0° between the cover plate 110 and the base 120). The base 120 has a sidewall 121 that is connected to the top surface 122. For example, the sidewalls 121 may be inclined relative to the top surface 122. In some embodiments, the sidewalls 121 may be substantially perpendicular to the top surface 122. An opening portion 123 is formed on the sidewall 121. In some embodiments, a heat dissipation mechanism (not shown) may be disposed within the base 120, and selectively inhales cold air from the outside for heat exchange, and discharges the hot air after the heat exchange through the opening portion 123 (for example, shown as the airflow F in FIG. 5).

Furthermore, the cam 140 has a plurality of teeth 141. An engaging portion 131 and an abutting portion 132 are respectively disposed at two ends of the push rod 130. The engaging portion 131 has a plurality of teeth 131A that are selectively coupled to the teeth 141 of the cam 140. In some embodiments, the engaging portion 131 has a fan-shaped gear structure. In some embodiments, the numbers of teeth of the cam 140 and the engaging portion 131 are different. For example, the number of teeth of the cam 140 is smaller than the number of teeth of the engaging portion 131, so that the bezel 150 is rotatable to a position corresponding to the closing or opening portion of the cover plate 110. When the cover plate 110 is in the closed state, the bezel 150 may be retracted over the cover plate 110 and located above the top surface 122 of the base 120.

Figure 4:
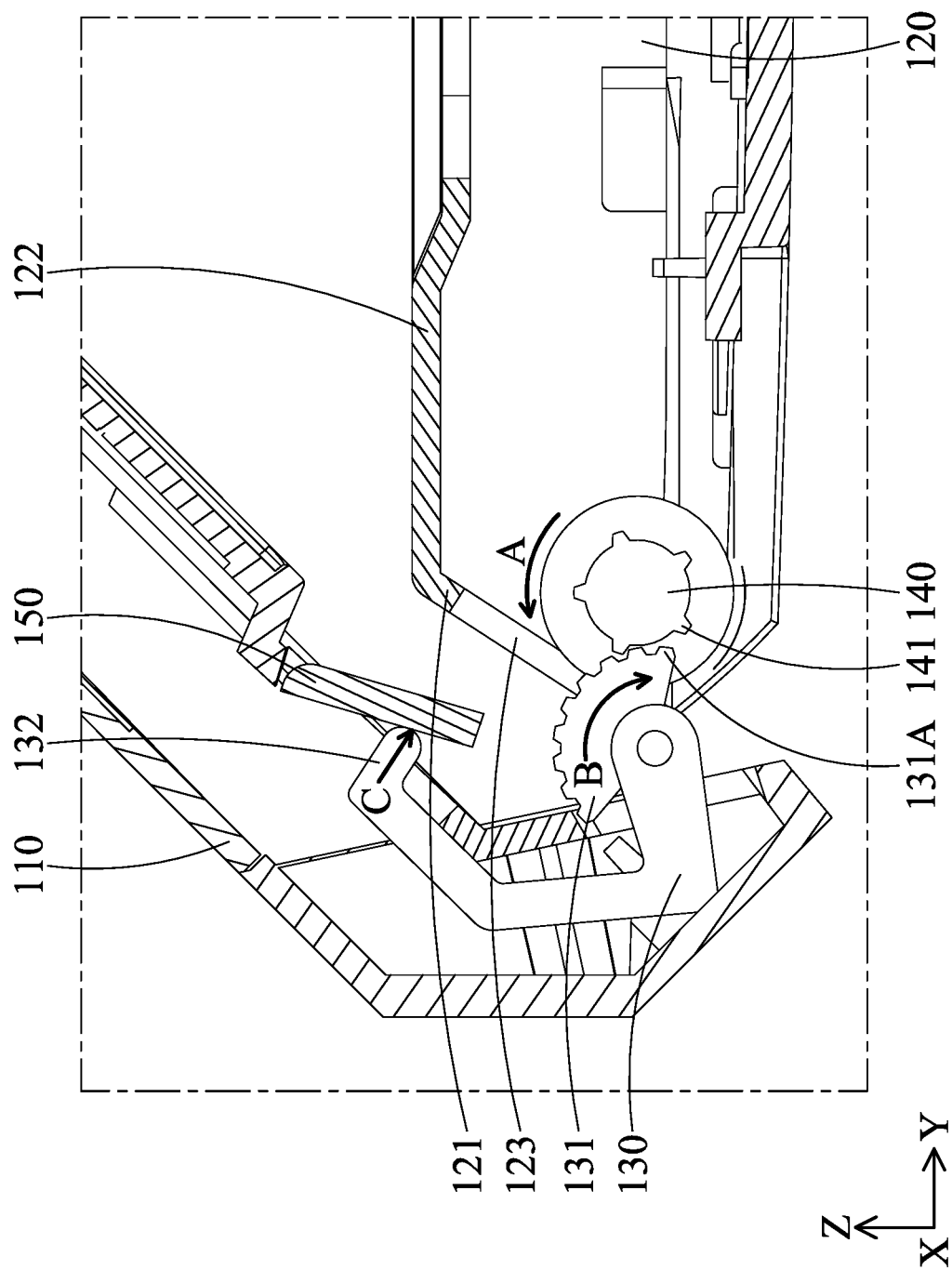
FIG. 4 illustrates a cross-sectional view of the electronic device in accordance with some embodiments of the present disclosure.

FIG. 4 illustrates a cross-sectional view of the electronic device 100 in accordance with some embodiments of the present disclosure. As shown in FIG. 4, the user may apply force to the cover plate 110 for rotating the cover plate 110 relative to the base 120. In the present embodiment, the angle between the cover plate 110 and the base 120 is about 45°. When the cover plate 110 rotates, the hinge and the cam 140 are driven to rotate in the direction A (for example, counterclockwise). Meanwhile, the push rod 130 combined with the cam 140 rotates in the direction B (for example, clockwise), and the abutting portion of the push rod 130 pushes the bezel 150 in the direction C, so that the bezel 150 connected to the cover plate 110 rotates toward opening portion 123 (for example, counterclockwise).

Figure 5:
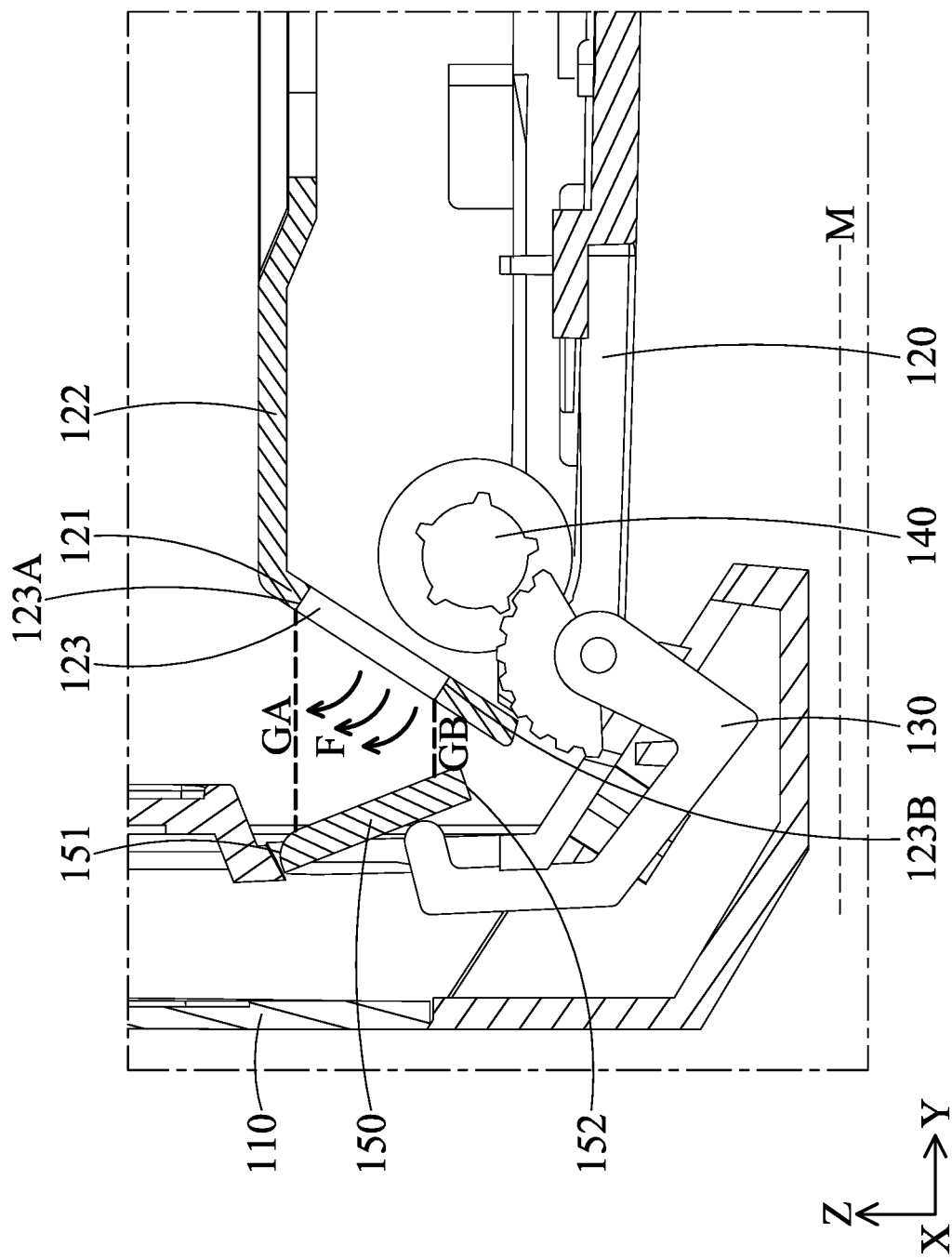
FIG. 5 illustrates a cross-sectional view of the electronic device in accordance with some embodiments of the present disclosure.

FIG. 5 illustrates a cross-sectional view of the electronic device 100 in accordance with some embodiments of the present disclosure. As shown in FIG. 5, the user may continue to apply force to the cover plate 110, so that the angle between the cover plate 110 and the base 120 is about 90° (which may be defined as the cover plate 110 being in an open state relative to the base 120). At this time, the bezel 150 connected to the cover plate 110 rotates to be positioned and facing the opening portion 123. In some embodiments, when the cover plate 110 is opened relative to the base 120, a first gap GA is formed between the bezel 150 and the up edge 123A of the opening portion 123, and a second gap GB is formed between the bezel 150 and the down edge 123B of the opening portion 123. For example, the first gap GA and the second gap GB may be measured in the horizontal direction (for example, the direction that is substantially parallel to the Y-axis). In some embodiments, the first gap GA is greater than the second gap GB. For example, the first gap GA may be between about 6 mm and about 7 mm, and the second gap GB may be between about 1 mm and about 2 mm. In some embodiments, the first gap GA is greater than five times the second gap GB. The arrangement of the bezel 150 may reduce the second gap GB between the bezel 150 and the down edge 123B of the opening portion 123, reducing the airflow F after the heat exchange flows downward and back to the heat dissipation mechanism (not shown) in the base 120. Accordingly, the heat dissipation efficiency of the electronic device 100 may be improved.

In some embodiments, when the cover plate 110 is opened relative to the base 120, the up edge 151 of the bezel 150 is higher than the up edge 123A of the opening portion 123, and the down edge 152 of the bezel 150 is down than the down edge 123B of the opening portion 123. In other words, when the cover plate 110 is opened relative to the base 120, the distance between the up edge 151 of the bezel 150 and a horizontal plane M (for example, the X-Y plane below the base 120) is greater than the distance between the up edge 123A of the opening portion 123 and the horizontal plane M, and the distance between the down edge 152 of the bezel 150 and the horizontal plane M is smaller than the distance between the down edge 123B of the opening portion 123 and the horizontal plane M. As a result, it is ensured that the arrangement of the bezel 150 reduces the distance (for example, the second gap GB) between the bezel 150 and the down edge 123B of the opening portion 123, so as to improve the heat dissipation efficiency of the electronic device 100. It should be noted that the above configuration is only an example, and is not intended to limit the present disclosure. For example, the angle between the cover plate 110 and the base 120 may be any angle from 0° to 90°, or even an obtuse angle greater than 90° may be formed between the cover plate 110 and the base 120. It should be understood that the cam 140 and the push rod 130 of the present disclosure may serve as an exemplary configuration of the driving assembly for pushing the bezel 150 to rotate, but the present disclosure is not limited thereto. Any driving assembly that pushes the bezel 150 to rotate is included within the scope of the present disclosure.

Figure 6:
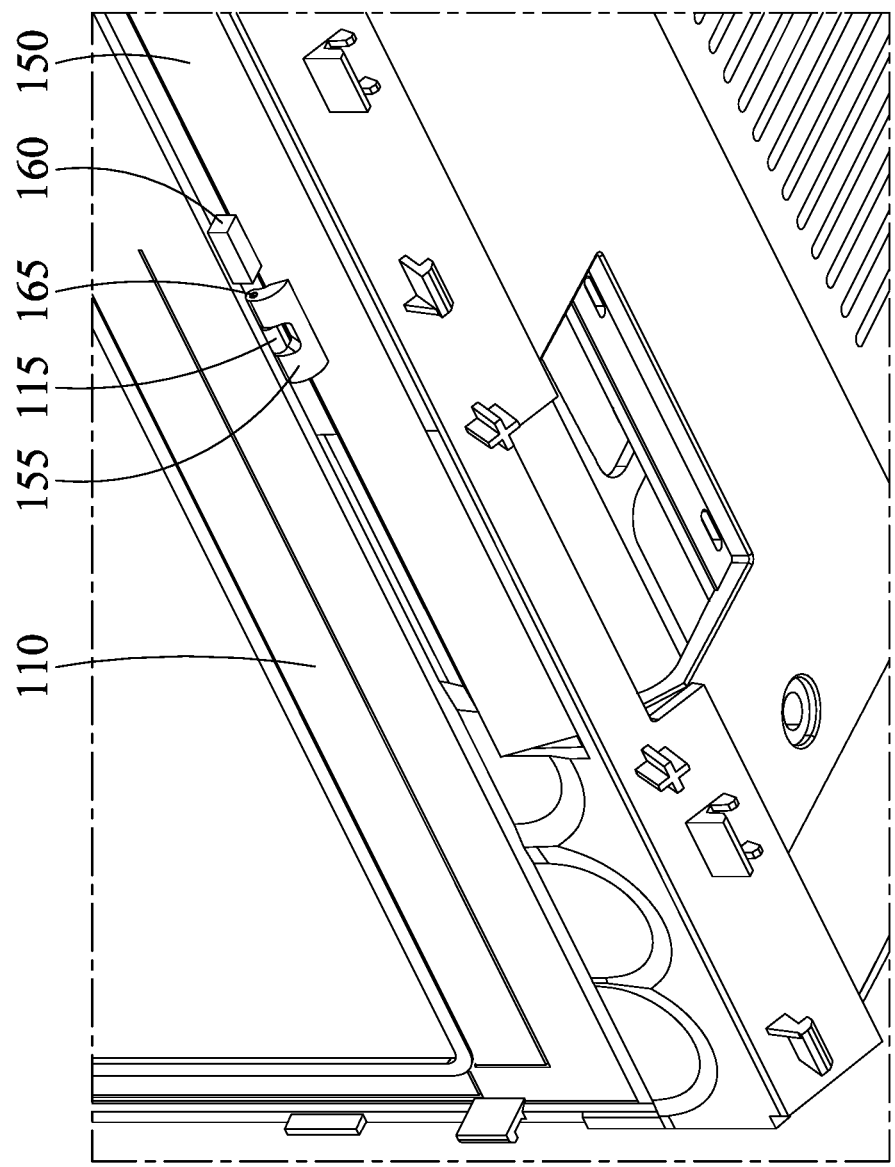
FIG. 6 illustrates a perspective view of the interior structure of the bezel in accordance with some embodiments of the present disclosure.

FIG. 6 is a perspective view of the internal structure of the cover plate 110 according to some embodiments of the present disclosure. In some embodiments, the cover plate 110 may have a connecting portion 115, the bezel 150 may have a linkage portion 155, and the pivot rod 165 may be disposed to pass through the connecting portion 115 of the cover plate 110 and the linkage portion 155 of the bezel 150. In this way, the bezel 150 may be pivotally connected to the cover plate 110 via the pivot rod 165. As shown in FIG. 6, in this embodiment, the cam 140 and the push rod 130 may be omitted, and a motor 160 is disposed on the cover plate 110. The motor 160 selectively connects and drives the pivot rod 165 to drive the linkage portion 155 of the bezel 150 to rotate, so that the bezel 150 faces the opening portion 123 (for example, referring to FIGS. 3 to 5). For example, the electronic device 100 may have a sensor (such as the sensors 181 and 182 shown in FIG. 2), which selectively detects the relative position of the cover plate 110 and the base 120, and the sensor may control the motor 160 (for example, when it detects that the cover plate 110 is opened) to drive the bezel 150 to rotate. It should be understood that the motor 160 and the sensor (the sensors 181 and 182) of the present disclosure may serve as an exemplary configuration of the driving assembly for pushing the bezel 150 to rotate, but the present disclosure is not limited thereto. Any driving assembly that pushes the bezel 150 to rotate is included within the scope of the present disclosure.

Figure 7:
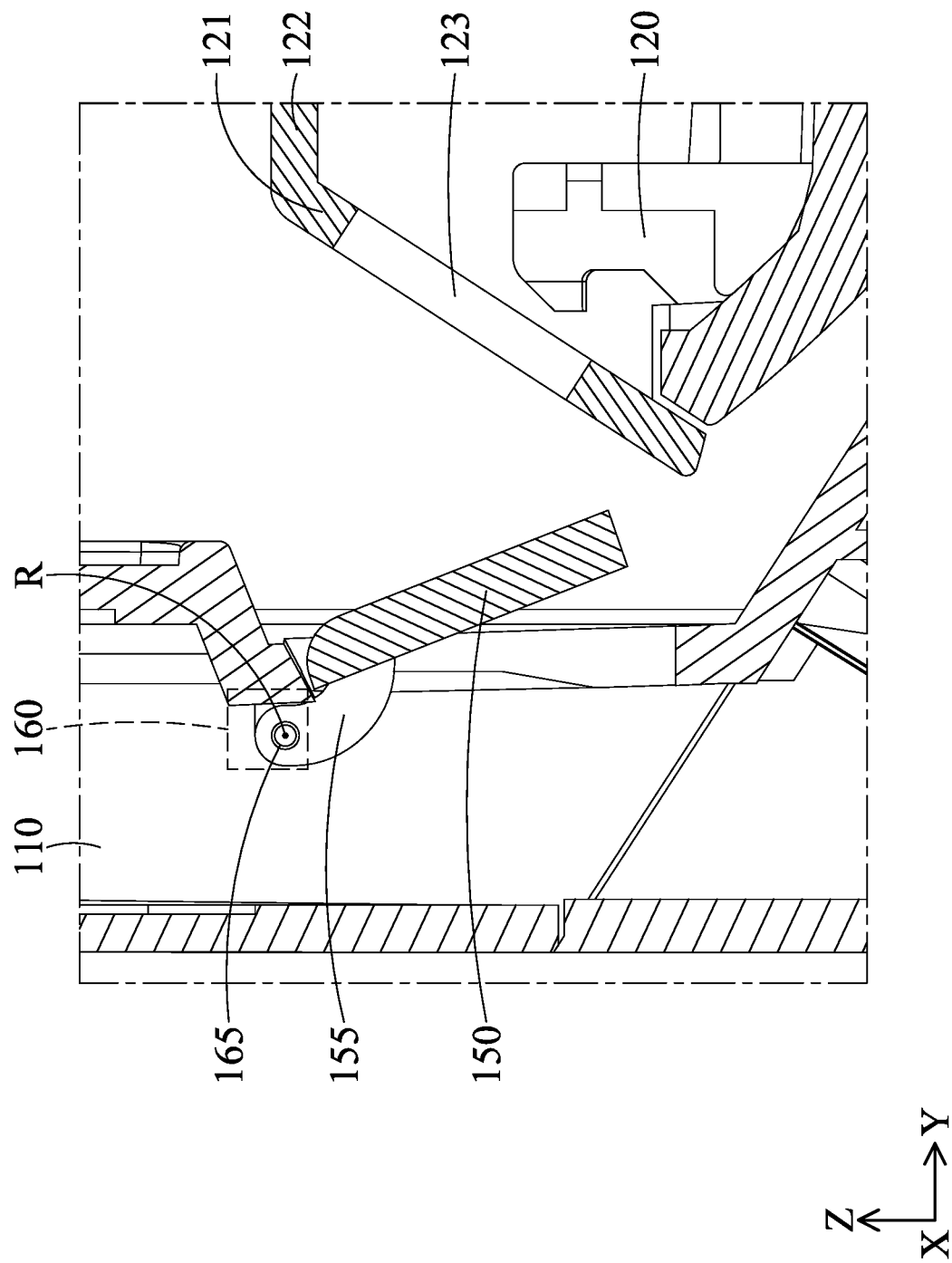
FIG. 7 illustrates a cross-sectional view of the electronic device in accordance with some embodiments of the present disclosure.

FIG. 7 illustrates a cross-sectional view of the electronic device 100 in accordance with some embodiments of the present disclosure. As shown in FIG. 7, when viewed in a direction (such as the X direction) that is parallel to the rotation axis R (for example, the extending direction of the pivot rod 165) of the bezel 150, the motor 160 (shown in dotted lines) may overlap with the pivot rod 165. In some embodiments, the motor 160 may be disposed adjacent to the connecting portion 155 of the bezel 150. In some embodiments, the motor 160 may selectively adjust the position of the bezel 150 steplessly within the rotation range of the bezel 150, and may precisely control the bezel 150 as required.

Figure 8:
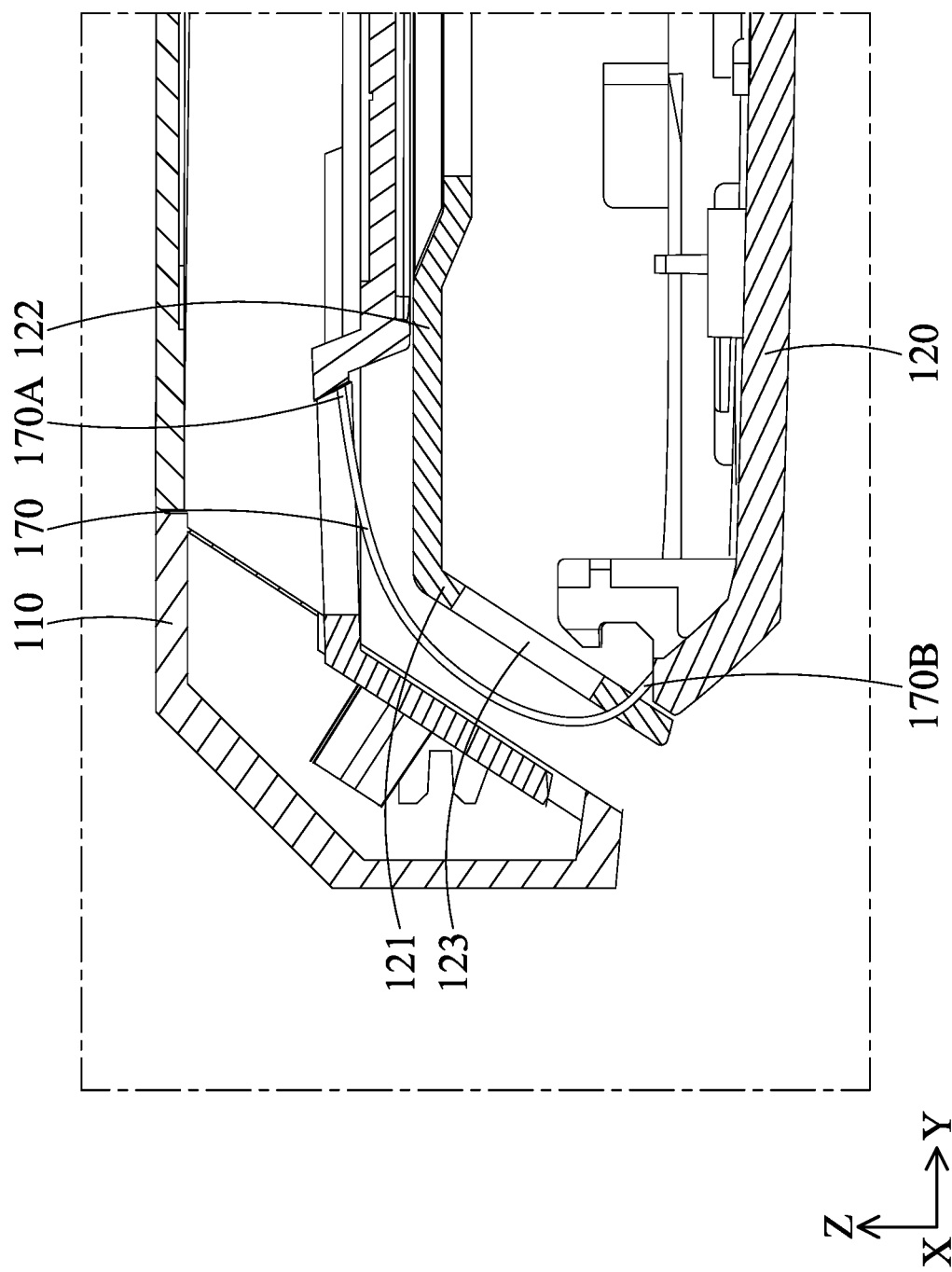
FIG. 8 illustrates a cross-sectional view of the electronic device in accordance with some embodiments of the present disclosure.

FIG. 8 illustrates a cross-sectional view of the electronic device 100 in accordance with some embodiments of the present disclosure. As shown in FIG. 8, in this embodiment, a bezel 170 may be disposed to replace the bezel 150. In some embodiments, the first end 170A and the second end 170B of the bezel 170 may be connected to the cover plate 110 and the base 120, respectively. In some embodiments, the bezel 170 is disposed under the opening portion 123 and includes a flexible material. For example, the bezel 170 may include polymer or any other suitable organic material. When the cover plate 110 is in the closed state relative to the base 120 (for example, there is a 0° angle between the cover plate 110 and the base 120), since the cover plate 110 substantially covers the top surface 122 of the base 120, the portion of the bezel 170 (for example, the portion connected to the cover plate 100) may extend above the top surface 122 of the base 120.

Figure 9:
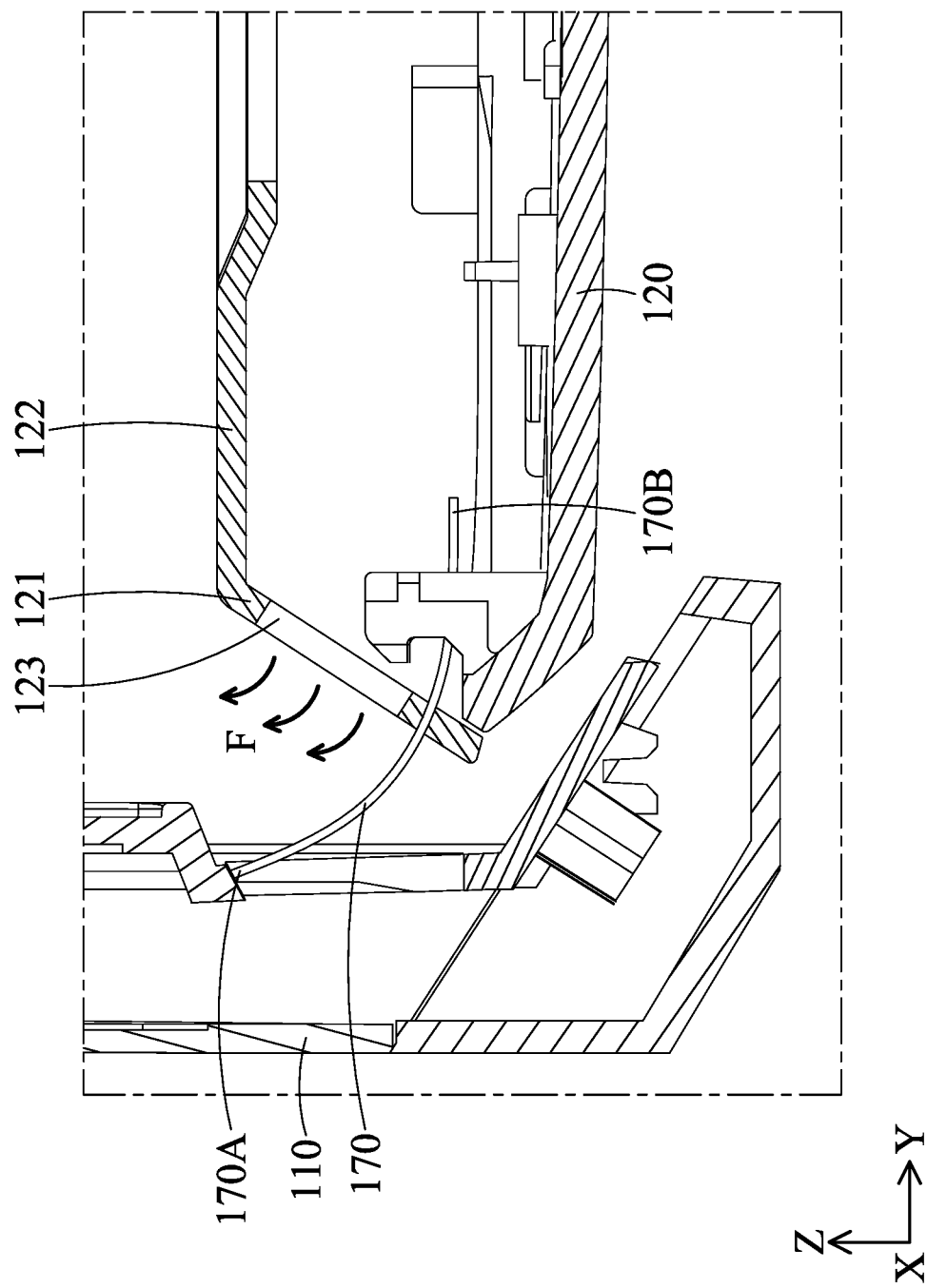
FIG. 9 illustrates a cross-sectional view of the electronic device in accordance with some embodiments of the present disclosure.

FIG. 9 illustrates a cross-sectional view of the electronic device 100 in accordance with some embodiments of the present disclosure. As shown in FIG. 9, when the cover plate 110 is in an open state relative to the base 120 (for example, there is a 90° angle between the cover plate 110 and the base 120), the bezel 170 extends from the bottom of the opening portion 123 to the cover plate 110. The bezel 170 may extend to completely cover the gap between the opening portion 123 and the cover plate 110, so that the hot air (for example, the airflow F) discharged from the opening portion 123 after the heat exchange would not flow back into the base 120, enhancing the heat dissipation efficiency of the electronic device 100.

In some embodiments, the bezel 170 (for example, the first end 170A) may be fixed to the cover plate 110 and is movable relative to the base 120 (for example, the second end 170B), but the present disclosure is not limited thereto. In other embodiments, the first end 170A of the bezel 170 may be fixed to the cover plate 110, and the second end 170B may be fixed to the base 120. Since the bezel 170 is made of a flexible material, it can expand or contract along with the rotation of the cover plate 110 and will not be damaged due to the change of the position of the cover plate 110.

As set forth above, the present disclosure provides an electronic device including a bezel. The arrangement of the bezel may reduce the distance (possibly down to 0) between the bezel and the down edge of the opening portion of the base, further reduce the airflow after the heat exchange flowing downwards and back to the heat dissipation mechanism in the base. The heat dissipation efficiency of the electronic device may be improved. In addition, the bezel may also be combined with a sensor structure that is commonly used in electronic devices to improve the accuracy of the operation of the bezel.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electronic device, comprising:
   a base having a sidewall, wherein an opening portion is formed on the sidewall, and an airflow selectively passes through the opening portion;
   a cover plate pivotally connected to the base;
   a bezel having a longitudinal top edge and a longitudinal bottom edge, the longitudinal top edge pivotally connected to the cover plate; and
   a driving assembly, a part of the driving assembly located in the base and another part of the driving assembly disposed on the cover plate and abutting with the bezel;
   wherein when cover plate is rotated from a closed position to an open position, the driving assembly drives the bezel to rotate relative to the cover plate such that the longitudinal bottom edge is closer to the sidewall than the longitudinal top edge, and the bezel deflects the airflow passing out of the opening portion.

2. The electronic device as claimed in claim 1, wherein the bezel is pushed to rotate via the driving assembly selectively.

3. The electronic device as claimed in claim 2, wherein the driving assembly comprises:
   a cam selectively rotating with the rotation of the cover plate relative to the base; and
   a push rod connected to the cam, and one end of the push rod is abutted against the bezel.

4. The electronic device as claimed in claim 3, wherein the push rod comprises an engaging portion, the engaging portion is provided with a plurality of teeth, and the teeth of the engaging portion are engaged with a plurality of teeth of the cam.

5. The electronic device as claimed in claim 4, wherein the cam and the engaging portion have different numbers of teeth.

6. The electronic device as claimed in claim 4, wherein the engaging portion has a fan-shaped gear structure.

7. The electronic device as claimed in claim 1, wherein when the cover plate is opened relatively to the base, a first gap is formed between the bezel and an up edge of the opening portion, a second gap is formed between the bezel and the down edge of the opening portion, and the first gap is greater than the second gap.

8. The electronic device as claimed in claim 7, wherein the first gap is greater than five times of the second gap.

9. The electronic device as claimed in claim 7, wherein when the cover plate is opened relatively to the base, a distance from an up edge of the bezel to a horizontal plane is greater than a distance from the up edge of the opening portion to the horizontal plane.

10. The electronic device as claimed in claim 7, wherein when the cover plate is opened relatively to the base, a distance from a down edge of the bezel to a horizontal plane is less than a distance from the down edge of the opening portion to the horizontal plane.

11. An electronic device, comprising:
    a base having a sidewall, wherein an opening portion is formed on the sidewall, and an airflow selectively passes through the opening portion;
    a cover plate pivotally connected to the base;
    a bezel having a longitudinal top edge and a longitudinal bottom edge, the longitudinal top edge pivotally connected to the cover plate; and
    a driving assembly connected to the cover plate, wherein the bezel is pushed to rotate via the driving assembly selectively, wherein the driving assembly comprises:
    a motor disposed on a surface of the cover plate facing the base and selectively driving the bezel to rotate relative to the cover plate such that the longitudinal bottom edge is closer to the sidewall than the longitudinal top edge, and the bezel deflects the airflow passing out of the opening portion.

12. The electronic device as claimed in claim 11, wherein the driving assembly further comprises a sensor, a relative position of the cover plate and the base is detected by the sensor, and the bezel is selectively driven by the motor to rotate via detecting the relative position for controlling the motor.

13. The electronic device as claimed in claim 11, wherein the bezel is pivotally connected to a pivot rod of the cover plate via a linkage portion, and the motor is disposed adjacent to the linkage portion.

14. The electronic device as claimed in claim 13, wherein the motor is connected to the pivot rod, the linkage portion is selectively driven by the motor via the pivot rod, the bezel is driven to rotate toward the opening portion via the linkage portion.

15. The electronic device as claimed in claim 13, when viewed in a direction parallel to a rotation axis of the bezel, the motor overlaps with the pivot rod.

16. An electronic device, comprising:
    a base having a sidewall, wherein an opening portion is formed on the sidewall, and an airflow selectively passes through the opening portion;
    a cover plate pivotally connected to the base;
    a bezel having a longitudinal top edge and a longitudinal bottom edge, the longitudinal top edge pivotally connected to the base and the cover plate, wherein the bezel is disposed below the opening portion; and
    a driving assembly, a part of the driving assembly located in the base and another part of the driving assembly disposed on the cover plate and abut with the bezel;
    wherein when cover plate is rotated from a closed position to an open position, the driving assembly drives the bezel to rotate relative to the cover plate such that the longitudinal bottom edge is closer to the sidewall than the longitudinal top edge, and the bezel deflects the airflow passing out of the opening portion.

17. The electronic device as claimed in claim 16, wherein the bezel comprises a flexible material.

18. The electronic device as claimed in claim 16, wherein when the cover plate is closed relatively to the base, a portion of the bezel extends over a top surface of the base.

19. The electronic device as claimed in claim 16, wherein when the cover plate is opened relatively to the base, the bezel extends from a bottom of the opening portion toward the cover plate.

20. The electronic device as claimed in claim 16, wherein the bezel is fixed to the cover plate and is movable relatively to the base.

\* \* \* \* \*